UNITED STATES PATENT OFFICE.

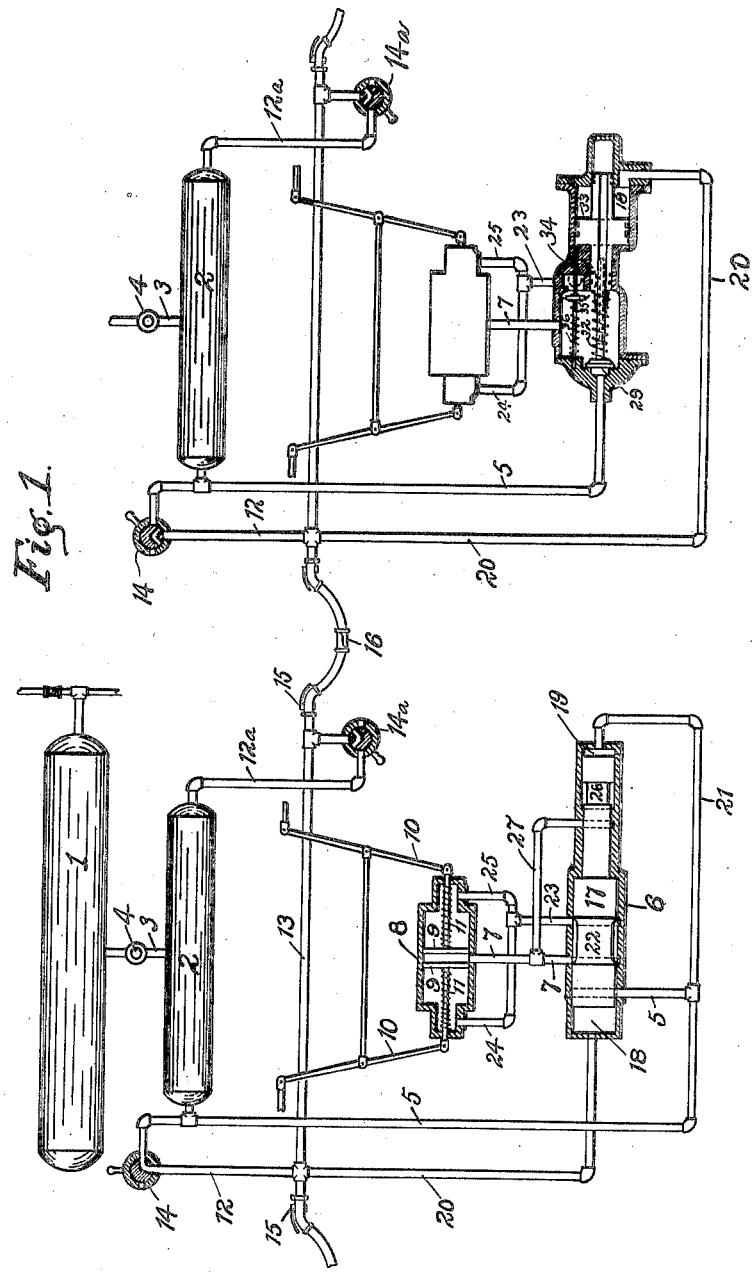

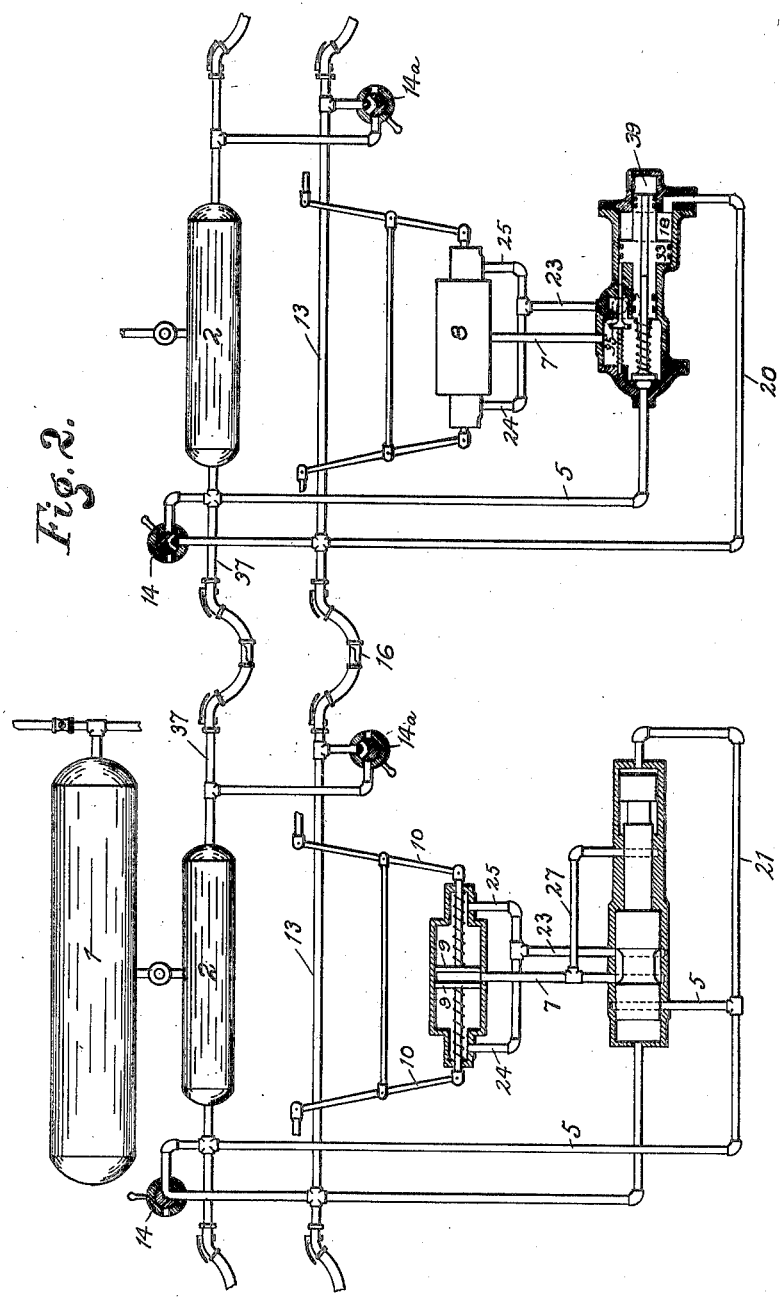

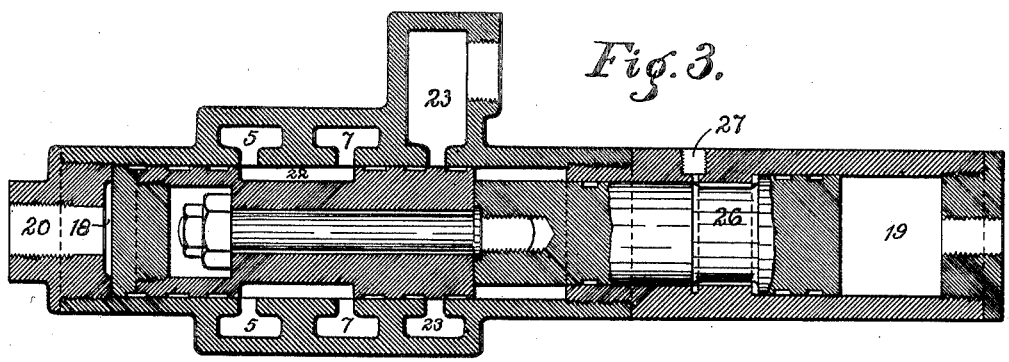
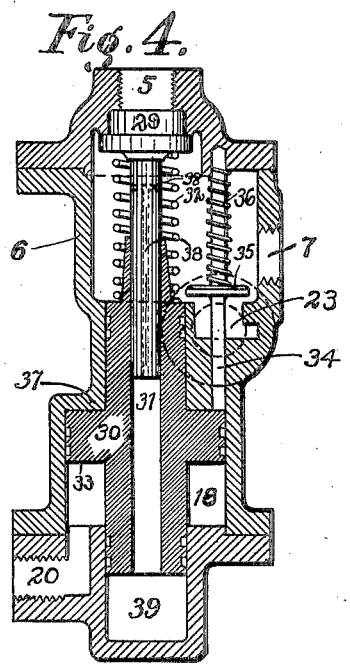
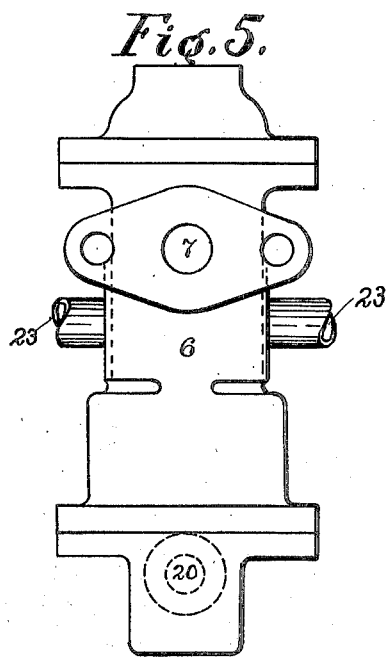

FRANK B. RAE, OF RIDGEWOOD, NEW JERSEY, ASSIGNOR TO THE RAE ELECTRIC & MANUFACTURING COMPANY, OF NEW YORK, N. Y., A CORPORATION OF NEW YORK.

BRAKE SYSTEM.

No. 804,502.      Specification of Letters Patent.      Patented Nov. 14, 1905.

Application filed September 4, 1901. Renewed September 7, 1905. Serial No. 277,474.

*To all whom it may concern:*

Be it known that I, FRANK B. RAE, a citizen of the United States, residing at Ridgewood, in the county of Bergen and State of New Jersey, have invented certain new and useful Improvements in Brake Systems, of which the following is a full, clear, and exact specification.

This invention relates to air-brake systems; and its object is to provide a simple and efficient brake system wherein each car is provided with mechanism adapted to be operated independently as a unit or to be connected with similar units of mechanism upon other cars and operated as one unit of a multiple system.

A further object is to provide a brake system such that where two or more cars are operated in multiple the operator may by operating the mechanism upon any one car efficiently control the operation of the mechanism upon all the other cars in the system.

Another object is to provide a system wherein the pressure for operating the brakes and the pressure for controlling the application of the pressure to the brakes may be derived from the same reservoir.

Another object is to provide mechanism of the character above described wherein the normal operation of the controlling-valve to effect a partial or incomplete reduction of pressure in the train-pipe first causes the introduction of reservoir-pressure to the brake-cylinder and then cuts off further pressure and permits a retarded falling of the pressure already in the brake-cylinder to ease off the brakes, whereby the operator may by the ordinary successive operations of the controlling-valve effect successive gradual and gentle applications of pressure to the brakes, increasing in power in proportion to the reduction in the train-pipe. At the same time in such construction I provide means for obtaining an emergency application of maximum pressure to the brakes.

The invention further comprehends an efficient construction of valve for use in connection with the system and various other details, which will be mentioned hereinafter.

In the accompanying drawings, Figure 1 illustrates a brake system embodying my invention; Fig. 2, a modified form of the same. Figs. 3 and 4 are sectional detail views of the valves shown in Figs. 1 and 2, and Fig. 5 is a rear view of the valve shown in Fig. 4.

Referring more particularly to the drawings, in Figs. 1 and 2 I have illustrated the apparatus upon two cars coupled to each other; but it will be understood that any number of cars may be coupled to each other or that any one car may be operated independently of the other cars.

1 represents the main reservoir, one of which may be carried upon each car throughout the system, or if operated under suitable conditions one such reservoir may be sufficient for the entire system. Upon each car is carried an auxiliary reservoir 2, communicating with the main reservoir by a pipe 3, in which is placed a suitable reducing-valve 4, which permits air to enter the auxiliary reservoir from the main reservoir whenever the pressure in the former drops below a predetermined limit. From the auxiliary reservoir 2 a pipe 5 leads to the controlling-valve 6, which will be hereinafter described, and from valve 6 a pipe 7 leads to the brake-cylinder 8.

9 9 represent the pistons in the brake-cylinder, which pistons operate the brake-rods 10 10 to apply and release the brakes. Springs 11 11 normally hold the pistons 9 in the position shown in the drawings in which the brakes are released.

Pipes 12 and 12$^a$ at the opposite ends of the car lead from the auxiliary reservoir 2 to the train-pipe 13. The three-way operating-valves 14 14$^a$ are located in the pipes 12 12$^a$. The usual shut-off valves 15 15 are located in the train-pipe at the opposite ends of the car and the couplings 16 permit the systems upon the various cars to be connected and disconnected.

The valve 6 is so arranged that the normal pressure in the train-pipe shuts off communication between the auxiliary reservoir and the brake-cylinder and so that upon a reduction of pressure in the train-pipe the pressure in the auxiliary reservoir will first open communication with the brake-cylinder and then automatically shut off such communication. In the drawings I have illustrated two forms of valve and will first describe that shown at the left-hand side of Figs. 1 and 2 and in detail in Fig. 3. In this construction a piston 17 is adapted to move longitudinally in the containing casing 6, the length of the piston being such that chambers 18 and 19 will be formed between the respective ends of the piston and the ends of the casing. A pipe 20 connects the train-pipe with chamber 18, and a pipe 21 connects the pipe 5, leading from the auxiliary reservoir, with the chamber 19. It will be noted that the area of the end of the piston 17 in chamber 18 is larger than the area of the piston in chamber 19, and therefore when the valve 14 is so moved as to connect the auxiliary reservoir 2 with the train-pipe and pipe 20, so that the train-pipe pressure equals that in the auxiliary reservoir, the piston 17 will be moved to the position shown in Fig. 1 of the drawings, owing to the larger area of the piston end in chamber 18. In this position the annular groove 22 in the piston 17 connects the pipe 7 with the pipe 23, which latter pipe branches into pipes 24 and 25 and leads into the brake-cylinder 8 on the opposite sides of the pistons 9 to that on which pipe 7 leads. A reduction of pressure in chamber 18 permits the pressure in chamber 19 to move the piston 17 to the position shown in Fig. 3 in which the annular groove 22 connects the ports of pipes 5 and 7. In this position the annular groove 26 in the piston will register with pipe 27, which connects with pipe 7. Owing to the difference in diameter between the central part of the piston and the portion thereof in chamber 19, the respective areas of the sides of the annular groove 26 are different, that upon which pressure acting tends to force the piston toward chamber 19 being greater. When the piston is in the position shown in Fig. 1, it closes pipe 27.

In the operation of the system the reduction-valves 4 will be adjusted to give the desired pressure in the auxiliary reservoir 2 and the main reservoir 1 upon the various cars will have been charged with air under such pressure as the tanks are adapted to stand. Valve 14 being turned to the position shown in Figs. 1 and 2, the pressure in the train-pipe and in the auxiliary reservoir will be the same, and therefore the piston 17 will by reason of the larger area in chamber 18 be moved to the position shown in Figs. 1 and 2, in which communication between the auxiliary reservoir and the brake-cylinder is cut off. In this position the pipes 7 and 23 are connected, and therefore such pressure as there may be between the two piston-heads 9 is allowed to pass by way of pipes 7, 23, 24, and 25 to the ends of the brake-cylinder on the opposite sides of the piston, at which ends the piston-rods are loosely fitted so as to permit a restricted leakage of air from the ends of the brake-cylinder to the atmosphere. Thus in this position the pressure in the brake-cylinder may escape into the atmosphere, allowing the springs 11 to move the pistons 9 to the position shown and release the brakes. To apply the brakes, the operator moves the valve 14 to vent some of the air in the train-pipe and then immediately closes the valve in the ordinary manner. Thus the valve is first turned to close communication between the reservoir 2 and pipe 12 and open communication between pipe 12 and the atmosphere and then it is turned to close all the ports, as shown at the right hand in Figs. 1 and 2. The first movement causes a reduction of pressure in the train-pipe, and consequently in chamber 18. The second movement prevents a further or too great reduction of pressure. Upon the reduction of pressure in chamber 18 the reservoir-pressure in chamber 19 becomes effective upon the smaller area of piston 17 to move the same so as to connect pipes 5 and 7 and pipe 27 with the annular groove 26. The connection of pipes 5 and 7 creates pressure in the brake-cylinder to apply the brakes, but to prevent a too rapid application under the ordinary service conditions the connection with pipe 27 is made, which creates a pressure upon the larger area of the right-hand end of the annular groove 26. This pressure added to the pressure remaining in chamber 18 will be sufficient to move the piston 17 back against the pressure in chamber 19 to cut off communication between the reservoir and brake-cylinder and at the same time connect pipes 7 and 23, which permits the pressure applied to the brakes, as above set forth, to leak out through pipes 23 and the ends of the brake-cylinder, thus cushioning the release of the brakes. Successive venting of air from the train-pipe will in like manner admit more reservoir-pressure to the brake-cylinder, and this, added to the pressure remaining in the brake-cylinder, will cause an increase of the power applied to the brakes, this power increasing in proportion to the reduction in the train-pipe. An emergency application may be had by simply venting from the train-pipe without closing the valve, thus causing a sudden and complete reduction of pressure in chamber 18 and permitting the resorvoir-pressure in chamber 19 to move the piston, the pressure from pipe 27 being unable alone to move the piston against the pressure in chamber 19.

It will be understood, of course, that the areas of the various parts of the pistons will be calculated and adjusted to meet various individual conditions of service.

The construction of the modified form of valve shown in Figs. 4 and 5 is substantially as follows: The piston 17 is divided into two parts 29 and 30, the latter having an axial passage 31, in which the part 29 is adapted to slide. A spring 32 of predetermined strength is interposed between two parts and serves to hold the part 29 against the opening of pipe 5, thus normally closing communication between the pipes 5 and 7. The part 30 is provided with a suitable flange 33, against which pressure from the train-pipe, through pipe 20, is exerted, thus normally holding the flange 33 under train-pipe pressure against the shoulder 37. When the part 30 is in this position, the spring 32 is under its maximum tension, and thus holds the valve to pipe 5 closed. In this position the flange 33 also impinges against the stem 34 of the valve 35, which controls the opening to the pipe 23 and lifts this valve just out of engagement with its seat. As soon as the flange 33 moves away from shoulder 37 the spring 36, surrounding the stem 34, will immediately move the valve 35 into engagement with its seat. In the stem of the part 29 is a longitudinal passage 38 of suitable diameter, which connects the interior of the valve with the passage 31 and the chamber 39 at the end of the valve. The operation of this form of valve is substantially as follows: Upon a lowering of pressure in chamber 18 the tension upon the spring 32 is reduced and the pressure upon the valve 29 from the reservoir opens the valve and permits the reservoir-pressure to pass from pipe 5 to pipe 7 and to the brakes. At the same time the flange 33, moving away from shoulder 37, permits the closing of valve 35; but the pressure from the reservoir passing through the small passage 38 in the stem 29 enters passage 31 and chamber 39, and this pressure acting upon the end of the part 30 and augmented by such pressure as remains in chamber 18 forces the part 30 back into its position with the flange 33 resting against shoulder 37. This opens valve 35 and permits the pressure from the brake-cylinder to pass slowly from the brake-cylinder through pipe 7 into pipe 23 and thence to the ends of the brake-cylinder. An emergency application of pressure is secured by venting from the train-pipe all the pressure in chamber 18, whereupon valve 35 is closed by its spring and valve 29 is opened by the reservoir-pressure. In this construction the tension of the spring 32 may be so adjusted as to compensate for varying relative areas of the piston in the chambers 5 and 18.

It will be understood, of course, that numerous forms of valves may be employed in lieu of the forms herein shown. I have therefore illustrated two equivalent forms and desire it to be understood that other modifications are to be included within my invention.

In the construction shown in Fig. 2 I have illustrated an equalizing-pipe 37, which connects the auxiliary reservoirs 22 upon the various cars. This will be found of service in operating the system upon trains made up of a number of cars. With the equalizing-pipe if the brakes of the entire train be operated from any one car the pressure taken from the reservoir upon the car from which the brakes are operated will be equalized by receiving air through the equalizing-pipe from the reservoirs upon the other cars.

It will be seen that the invention herein described may be used in connection with systems of trains, such as electrically-operated trains, which either carry the ordinary air-compressors to charge the various auxiliary reservoirs upon the cars or which employ a main reservoir or reservoirs independently charged at the power-station. It will also be understood that the invention herein described may be modified in various respects without departing from the invention, and I therefore do not limit myself herein to the precise construction and arrangement herein shown.

Having thus described my invention, I declare that what I claim as new, and desire to secure by Letters Patent, is—

1. In a brake system, the combination with the brake-cylinder and reservoir, of a valve adapted to establish communication between the reservoir and brake-cylinder, and then automatically establish a restricted passage from the brake-cylinder to the atmosphere, substantially as described.

2. In a brake system, the combination with the brake-cylinder and reservoir, of a train-pipe, a valve, and means whereby a partial reduction of pressure in the train-pipe will cause said valve to establish communication between the reservoir and brake-cylinder and then automatically establish a restricted passage from the brake-cylinder to the atmosphere, substantially as described.

3. In a brake system, the combination with the brake-cylinder and reservoir, of a train pipe and valve, and means whereby a partial reduction of pressure in the train-pipe will cause said valve to establish communication between the reservoir and brake-cylinder and then automatically establish a restricted passage from the brake-cylinder to the atmosphere and whereby a substantially complete reduction of pressure in the train-pipe establishes communication between the reservoir and brake-cylinder only, substantially as described.

4. In a brake system, the combination of a plurality of brake-cylinders, a plurality of reservoirs, a valve controlling communication between each reservoir and brake-cylinder and between each brake-cylinder and the atmosphere, a train-pipe, and means whereby a reduction of pressure in the train-pipe automatically causes said valve to first establish communication between the reservoirs and brake-cylinders and then close the same and establish communication between the brake-cylinders and the atmosphere, substantially as described.

5. In a brake system, the combination of a plurality of brake-cylinders, a plurality of reservoirs, a valve controlling communication between each reservoir and brake-cylinder and between each brake-cylinder and the atmosphere, a train-pipe, adapted to apply pressure upon the valve to close the communication between reservoir and brake-cylinder, means for applying pressure from the reservoirs tending to operate said valves to open said communication in opposition to the train-pipe pressure, means whereby when said communication is opened the valve is automatically operated to close said communication and open the communication between the brake-cylinder and the atmosphere, and means for varying the pressure in the train-pipe, substantially as described.

6. In a brake system, the combination of a source of pressure, a brake-cylinder and means for introducing pressure to the brake-cylinder and means, automatically operated by the introduction of pressure to the brake-cylinder, for gradually releasing said pressure, substantially as described.

7. In a brake system, the combination of a source of pressure, a brake-cylinder, means for successively introducing determined amounts of pressure to the brake-cylinder, and means, automatically operated by the introduction of pressure to the brake-cylinder, for gradually releasing the pressure upon each application thereof, substantially as described.

8. In a brake system, the combination of a reservoir, a brake-cylinder having communication therewith, a valve controlling said communication, means for applying pressure from said reservoir to said valve upon opposite sides of the same, and means for varying said pressure upon the respective sides of the valve, substantially as described.

9. In a brake system, the combination of a reservoir, a brake-cylinder having communication therewith, a valve controlling said communication, means for applying pressure from said reservoir upon opposite sides of said valve in such manner that the pressure upon one side of the valve overbalances that upon the other side, and means for varying the pressure upon one side of the valve, substantially as described.

10. In a brake system, the combination of a reservoir, a brake-cylinder having communication therewith, an exhaust from said brake-cylinder, a valve controlling said communication and said exhaust, and means for operating said valve by pressure from said reservoir to first open said communication and then close the same and open the exhaust, substantially as described.

11. In a brake system, the combination of a reservoir, a brake-cylinder having communication therewith, an exhaust from said brake-cylinder, a valve controlling said communication and said exhaust, means for applying pressure from said reservoir to operate said valve to open said communication, and means operative upon the opening of said communication for creating a difference of pressure upon said valve to first close said communication and then open the exhaust, substantially as described.

12. In a brake system, the combination of a reservoir, a brake-cylinder having communication therewith, a valve controlling said communication, means for applying pressure from the reservoir to the opposite sides of said valve, said valve having a larger area opposed to said pressure upon one side, whereby said valve will be normally closed, means for lowering the pressure upon the side of the valve having a larger area, and means for applying pressure from the reservoir to close said valve when the pressure upon the side of the valve having the larger area is reduced, substantially as described.

13. In a brake system, the combination of a plurality of cars each of which carries a reservoir, a brake-cylinder having communication therewith, a valve controlling said communication and means for operating said valve by pressure from the reservoir, and an equalizing-pipe connecting the reservoirs of the several cars together, substantially as described.

14. In a brake system, the combination of a plurality of cars each of which carries a reservoir, a brake-cylinder having communication therewith and a valve controlling said communication, and means for operating said valve by pressure from the reservoir; a train-pipe extending the length of the train of cars and being adapted to deliver pressure from said reservoirs to control the operation of said valves, and means for controlling the pressure in the train-pipe from the several cars, substantially as described.

15. In a brake system, the combination of a brake-cylinder, an exhaust therefrom, a reservoir, a communication between the brake-cylinder and reservoir, a valve controlling said communication, a train-pipe containing air under pressure adapted to normally maintain the valve closed, and means whereby a partial reduction of train-pipe pressure will cause the valve to first open communication between the reservoir and brake-cylinder and then automatically close it and open the exhaust, substantially as described.

16. In a brake system, the combination of a brake-cylinder, an exhaust therefrom, a reservoir, a communication between the brake-cylinder and reservoir, a valve controlling said communication, a train-pipe containing air under pressure adapted to normally maintain the valve closed, and means whereby a partial reduction of train-pipe pressure will cause the valve to first open communication between the reservoir and brake-cylinder, and then close it and open the exhaust, and whereby a substantially complete reduction of train-pipe pressure will open the communication as aforesaid and maintain it open, substantially as described.

17. In a brake system, the combination with the brake-cylinder and reservoir, of a valve adapted to establish communication between the reservoir and the brake-cylinder, then to automatically cut off the communication and reduce the effective pressure in the brake-cylinder, substantially as described.

18. In a brake system, the combination with the brake-cylinder and reservoir, of a valve adapted to establish communication between the reservoir and the brake-cylinder, then to automatically cut off the communication, and after an interval, to equalize the pressures on the brake-piston, substantially as described.

19. In a brake system, the combination of a brake-cylinder and a reservoir, a valve controlling the communication between the reservoir and the brake-cylinder, and an equalizing-passage connecting both sides of the brake-cylinder and controlled by said valve, substantially as described.

20. In a brake system, the combination with the brake-cylinder and reservoir, of a valve adapted to establish communication between the reservoir and the brake-cylinder, and then to automatically regulate the admission of counterbalancing pressure to control the force of application of the brakes, substantially as described.

21. In a brake system, the combination with the brake-cylinder and reservoir, of a valve adapted to establish communication between the reservoir and the brake-cylinder, and then to regulate the admission of counterbalancing pressure to control the force of application of the brakes, substantially as described.

22. In a brake system, the combination with the brake-cylinder and reservoir, of a valve adapted to establish communication between the reservoir and the brake-cylinder, and then to automatically cut off communication and to regulate the admission of counterbalancing pressure to the brake-cylinder, substantially as described.

23. In a triple valve, adapted to be operated by train-pipe pressure, the combination of means whereby a reduction in train-pipe pressure will cause the valve to assume the brake-applying position and means whereby the valve will thereupon automatically assume its normal, neutral position, substantially as described.

24. In a triple valve adapted to be operated by train-pipe pressure, the combination of means whereby a reduction in train-pipe pressure will cause the valve to assume the brake-applying position and means whereby the valve will thereupon automatically assume its normal neutral position, and whereby a complete venting of train-pipe pressure would cause the valve to assume and maintain the brake-applying position, substantially as described.

In testimony whereof I affix my signature in presence of two witnesses.

FRANK B. RAE.

Witnesses:
C. V. EDWARDS,
HENRY BEST.